United States Patent [19]
Kraus

[11] Patent Number: 4,938,378
[45] Date of Patent: Jul. 3, 1990

[54] CLOSURE COVER

[75] Inventor: Willibald Kraus, Grünstadt, Fed. Rep. of Germany

[73] Assignee: TRW United-Carr GmbH & Co., Enkenbach-Alsenborn, Fed. Rep. of Germany

[21] Appl. No.: 353,011

[22] Filed: May 17, 1989

[30] Foreign Application Priority Data

May 26, 1988 [DE] Fed. Rep. of Germany ....... 3817896

[51] Int. Cl.⁵ .............................................. B65D 39/00
[52] U.S. Cl. ............................ 220/307; 220/DIG. 19
[58] Field of Search ........................ 220/307, DIG. 19

[56] References Cited

U.S. PATENT DOCUMENTS

| | | | |
|---|---|---|---|
| 2,266,270 | 12/1941 | Roth | 220/307 X |
| 3,021,975 | 2/1962 | Sarafinas | 220/307 |
| 3,332,572 | 7/1967 | Green | 220/307 |
| 4,646,932 | 3/1987 | Masler | 220/307 |
| 4,682,707 | 7/1987 | Wiles | 220/307 |
| 4,738,376 | 4/1988 | Markus | 220/307 X |
| 4,760,935 | 8/1988 | van den Beld et al. | 220/DIG. 19 X |
| 4,784,285 | 11/1988 | Patel | 220/307 |
| 4,801,040 | 1/1989 | Kraus | 220/DIG. 19 X |

*Primary Examiner*—Steven M. Pollard
*Attorney, Agent, or Firm*—Fay, Sharpe, Beall, Fagan, Minnich & McKee

[57] ABSTRACT

A closure cover (1) formed of plastic and especially suited for closing an opening (6) in a motor vehicle body includes a bottom part (2), which is joined with a sealing lip (3) which lies against the upper side of a support (5). The cover also includes a catch ring (10) that lies opposite the sealing lip and sealingly engages against the underside of the support (5). The catch ring (10) further includes a sealing surface (13) which sealingly engages against the inner surface (14) of the opening (6) in the support (5).

1 Claim, 1 Drawing Sheet

CLOSURE COVER

BACKGROUND OF THE INVENTION

The subject invention is directed to a closure cover formed of plastic and especially intended for closing an aperture or opening in a frame or body panel of a motor vehicle.

Closure covers of the general type under construction are known in the prior art (see for example German Patent 3,446,151). In the closure cover of this prior German patent the sealing effort takes place through the cooperation of the sealing lip on the one side of the opening, and the catching ring lying opposite thereto on the other side of the opening. The catch ring, however, functions to seal the opening only over a relatively short radial distance. Also, with the closure cover of this prior design, there is no automatic centering of the closure cover in the opening. The subject invention provides an improved design for this known type of closure cover so that the forces required for installing the cover in the opening are diminished and tolerance compensation of the closure to the opening is increased. In addition, the ability of the closure cover to center itself in the opening in the support is improved.

BRIEF SUMMARY OF THE INVENTION

In particular, the subject invention provides a plastic closure cover of the general type described especially suited for closing an opening which extends between first and second opposed exterior faces of a support member. According to the invention, the closure cover comprises a plastic body having a bottom wall with a circumferentially extending first sealing lip joined thereto and adapted to lie against the first face of the support member and about the opening. A circumferentially extending sealing catch ring is joined to the bottom wall and lies opposite the sealing lip and terminates in a free end adapted to engage about the opening against the second face opposite the first face. In addition, a circumferentially continuous sealing surface is carried by the catch ring that extends toward the sealing lip. The sealing surface is sized to tightly and sealingly engage about the inner peripheral surface of the opening in the support member. By the arrangement described, the catch ring seals against the inner face of the support and additionally the added sealing surface cooperates with the inner surface of the opening in the support to provide a greatly improved sealing effect. At the same time, this additional sealing surface acts as an automatic centering mechanism for the closure cover in the opening in the support. Also, the bottom wall or support crown of the cover can be reduced in diameter. This allows it to better adapt to different hold diameters.

DETAILED DESCRIPTION OF THE DRAWINGS

The above and other advantages of the invention will become apparent from the following description when read in conjunction with the accompanying drawings which illustrate preferred embodiments of the invention and wherein.

DETAILED DESCRIPTION OF THE PREFERRED AND ALTERNATE EMBODIMENTS

Figure 1:
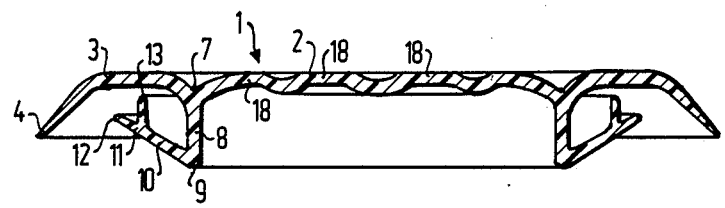
FIG. 1 is a vertical cross-sectional view through a closure cover formed in accordance with the invention.

Referring more particularly to the drawings wherein the showings are for the purpose of illustrating preferred and alternate embodiments of the invention only, and not for the purpose of limiting same, FIG. 1 illustrates a closure cover 1 which has a continuous imperforate bottom wall 2 which is illustrated as having corrugations or indentations 18 formed thereon. A circumferentially continuous sealing lip 3 extends radially outwardly from the bottom wall 2 and terminates in an outer free end rim portion 4 which is of tapered thickness and generally flexible. The lip 3 maintains its outer rim 4 in sealing engagement with the outer face of the support 5 about the opening 6 when the closure cover is installed therein.

Figure 3:
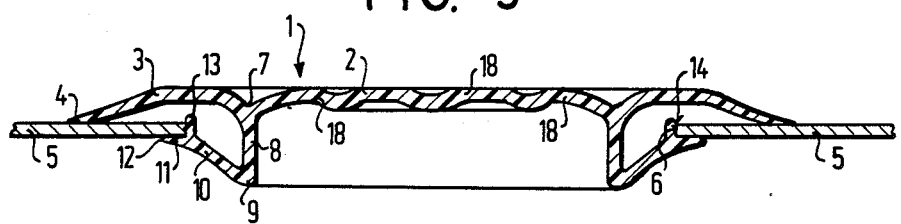
FIG. 3 is a vertical cross-sectional view illustrating the FIG. 1 embodiment seated in an opening of a support plate or member.

The bottom wall 2 further includes a support crown section 8 which carries a circumferentially continuous catch ring 10 which, in the FIG. 1 embodiment, joins the lower end 9 of the support crown 8. It should be noted that in the embodiment under consideration the support crown 8 is generally cylindrical and extends axially from the transition point 7 between the bottom wall 2 and the sealing lip 3. Referring again to the catch ring 10, it will be noted that catch ring 10 is radially shorter than the sealing lip 3 and extends diagonally upward toward the sealing lip 3. The outer free end 11 of the catch ring 10 is preferably flexible and tapered as shown and acts as a sealing lip to lie against the second or lower face of the support 5 when the closure cover 1 is set into the opening 6 of the support 5 as illustrated in FIG. 3.

The catch ring 10 further includes a circumferentially continuous ring-form sealing lip 13 which is of one piece construction and extends axially upward from the upper surface of the catch ring 10. As illustrated, the sealing lip 13 is located radially inward of the outer free end 12 of catch ring 10. The sealing lip 13 is sized and positioned such that its outer peripheral surface 14 lies against the inner peripheral surface of opening 6 as illustrated in FIG. 3. In this manner, the sealing of opening 6 is greatly improved because both the outer sealing zone 11 and the outer side wall 14 act as sealing surfaces. At the same time, the sealing lip ring 13 acts to center the closure cover 1 in the opening 6.

Figure 2:
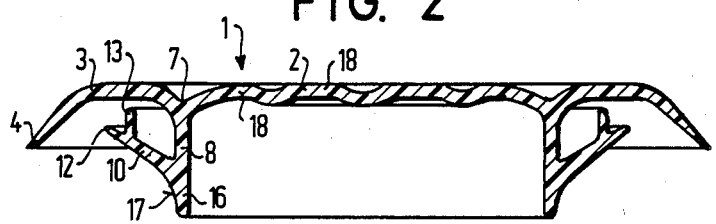
FIG. 2 is a cross-sectional view similar to FIG. 1 but illustrating a modified embodiment of the invention.

To improve and facilitate the setting in and centering of the closure cover 1 in the opening 6 of the support 5, the support crown 8 can be extended in length axially downward from the transition point between the crown and the catch ring. This arrangement is illustrated in the FIG. 2 embodiment. As shown therein, the support crown 8 includes an additional cylindrical ring part 16. The cylindrical ring part 16 can have a generally tapered configuration with an outer surface 17 which is smoothly arched into the lower or outer surface of the catch ring 10. This arrangement acts to facilitate positioning of the closure cover into the opening 6.

It should, of course, be understood that the diameter of the support crown 8 and the cylindrical ring part 16 could, if desired, be kept considerably smaller than the diameter of the opening 6 in the support 5. This arrangement would also facilitate installation of the closure cover in the opening and could reduce the installation forces required for mounting the closure cover.

Figure 4:
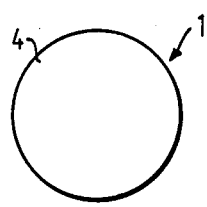
FIGS. 4 through 6 are top plan views of different forms of closure covers formed in accordance with the invention.
Figure 5:
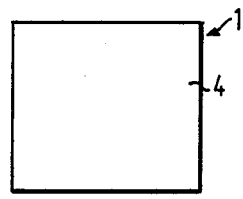
Figure 6:
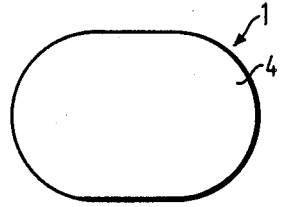

As is apparent, and as illustrated in FIGS. 4 through 6, the outer circumference of the sealing lip 3, the support crown 8 and the ring part 16, as well as the sealing lip 13 and the catch ring 10, may be designed with whatever peripheral shape is necessary to suit the particular opening which is to be closed. As shown in FIGS. 4 through 6, circular, rectangular, oval, or any other form desired could be provided. Additionally, as previously mentioned, the bottom wall 2 may have circular grooves or raised portions formed therein at spaced distances from each other. Additionally, it should be understood that many different plastics could be used for forming the cover of the subject invention. One material which is preferred is polyester-ester-urethane, such as that sold under the trademark ARNITEL.

The invention has been described in great detail sufficient to enable one of ordinary skill in the art to make and use the same. Obviously, modifications and alterations of the preferred embodiment will occur to others upon a reading and understanding of the specification. It is intended to include all such modifications and alterations as part of the invention insofar as they come within the scope of the appended claims.

What is claimed is:

1. A plastic closure cover especially suited for closing an opening which extends between first and second opposed exterior faces of a support member comprising: a plastic body having a transverse bottom wall with a circumferentially extending first sealing lip joined thereto and adapted to lie against the first face of the support member and about the opening, a circumferentially continuous catch ring joined to the bottom wall and lying opposite the first sealing lip and terminating in a flexible and tapered free end which extends diagonally toward the first sealing lip and is adapted to engage about the opening against the second face opposite the first face, and a circumferentially continuous ring form second sealing lip carried by said catch ring at a location radially inward of said free end and extending axially toward said first sealing lip, said second lip having a radially facing sealing surface sized to tightly and sealingly engage about the inner peripheral surface of the opening in the support member.

* * * * *